US010249009B2

(12) United States Patent
Ruan et al.

(10) Patent No.: US 10,249,009 B2
(45) **Date of Patent: *Apr. 2, 2019**

(54) MISSED FEED UNIT FOR CONTENT FEEDS

(71) Applicant: Facebook, Inc., Menlo Park, CA (US)

(72) Inventors: Chao Ruan, Sunnyvale, CA (US); Shilin Ding, Mountain View, CA (US); Jiayi Zhu, Fremont, CA (US); Wenyuan Yu, Fremont, CA (US); Li Zhang, Mountain View, CA (US); Gregory Matthew Marra, San Francisco, CA (US); Andrew Chung, San Francisco, CA (US); Zhiqiu Kong, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/663,379

(22) Filed: Jul. 28, 2017

(65) Prior Publication Data

US 2017/0337637 A1 Nov. 23, 2017

Related U.S. Application Data

(63) Continuation of application No. 14/336,901, filed on Jul. 21, 2014, now Pat. No. 9,747,647.

(51) Int. Cl.
*H04L 29/08* (2006.01)
*G06Q 50/00* (2012.01)

(52) U.S. Cl.
CPC ............ *G06Q 50/01* (2013.01); *H04L 29/08* (2013.01)

(58) Field of Classification Search
CPC ...................................................... G06Q 50/01
USPC ......................................................... 709/204
See application file for complete search history.

(56) References Cited

U.S. PATENT DOCUMENTS

| | | | |
|---|---|---|---|
| 7,669,123 | B2 | 2/2010 | Zuckerberg et al. |
| 7,827,208 | B2 | 11/2010 | Bosworth et al. |
| 8,171,128 | B2 | 5/2012 | Zuckerberg et al. |
| 8,402,094 | B2 | 3/2013 | Bosworth et al. |

(Continued)

OTHER PUBLICATIONS

U.S. Appl. No. 14/049,429, filed Oct. 9, 2013, Inventors: Yu et al.

(Continued)

*Primary Examiner* — David R Lazaro
*Assistant Examiner* — Zia Khurshid
(74) *Attorney, Agent, or Firm* — Fenwick & West LLP

(57) ABSTRACT

A social networking system provides a content feed to a client device associated with the user of a social networking system, the content feed including a plurality of content items. The social networking system identifies one or more missed content items, of the plurality of content items, that were part of the content feed and were not displayed by the client device. The social networking system generates a subsequent content feed that includes one or more content items that have not been previously provided to the client device and a missed feed unit that is associated with the one or more missed content items. In one embodiment, the missed feed unit, when selected, redirects the user to a new page that presents a different content feed including the identified missed content items. The social networking system provides the subsequent content feed to the client device for presentation to the user.

20 Claims, 5 Drawing Sheets

(56) References Cited

U.S. PATENT DOCUMENTS

| | | | | |
|---|---|---|---|---|
| 8,521,787 | B2 | 8/2013 | Bosworth et al. | |
| 8,700,636 | B2 | 4/2014 | Kao et al. | |
| 2008/0082673 | A1 | 4/2008 | Dynin et al. | |
| 2008/0082941 | A1* | 4/2008 | Goldberg | G06F 3/0482 715/810 |
| 2011/0173570 | A1* | 7/2011 | Moromisato | G06F 17/30994 715/838 |
| 2012/0166532 | A1 | 6/2012 | Juan et al. | |
| 2013/0031489 | A1 | 1/2013 | Gubin et al. | |
| 2014/0019261 | A1 | 1/2014 | Hegeman et al. | |
| 2014/0122622 | A1* | 5/2014 | Castera | H04L 51/32 709/206 |
| 2014/0156360 | A1 | 6/2014 | Shalita et al. | |
| 2014/0156566 | A1 | 6/2014 | Kabiljo et al. | |
| 2014/0156744 | A1 | 6/2014 | Hua et al. | |

OTHER PUBLICATIONS

Non-Final Office Action, U.S. Appl. No. 14/336,901, dated Sep. 9, 2016, twenty pages.

* cited by examiner

MISSED FEED UNIT FOR CONTENT FEEDS

CROSS REFERENCE TO RELATED APPLICATIONS

This application is a continuation of co-pending U.S. application Ser. No. 14/336,901, filed Jul. 21, 2014, which is incorporated by reference in its entirety.

BACKGROUND

This disclosure relates generally to social networking systems, and in particular to ways of incorporating content items previously delivered, but not viewed, to users of a social networking system into new content feeds.

Social networking systems allow users to connect to and communicate with other users of the social networking system. Users create profiles on a social networking system that are tied to their identities and include information about the users, such as interests and demographic information. The users may be individuals or entities such as corporations or charities. Because of the increasing popularity of social networking systems and the significant amount of user-specific information maintained by social networking systems, a social networking system allows users to easily communicate information about themselves to other users. For example, the social networking system generates stories describing actions performed by social networking system users and presents the stories to other social networking system users. However, not all stories delivered to a device associated a user are actually presented to the user. Additionally, this missed content may have more value to the user than other more current stories in subsequent content feeds.

SUMMARY

A social networking system generates content feeds including content items that are provided to a client device associated with a user for presentation to that user. However, in some embodiments, not all of the content items in the content feed are actually presented to the user. For example, a user may navigate away from the content feed after only viewing the first couple content items. The social networking system interfaces with the client device to determine what content items were previously provided to the client device in a content feed, but not actually viewed by the user. At some later time, a client device associated with the user may request a new content feed. The social networking system generates the new content feed and includes a missed feed unit that is associated with one or more of the missed content items, and provides the content feed to the client device.

The social networking system identifies one or more missed content items that were part of previous content feeds provided to client devices associated with the user and were not displayed by the client devices to the user. In some embodiments, the client devices determine whether content items are displayed to the user, and communicate which content items are missed content items to the social networking system.

The social networking system generates a subsequent content feed that includes one or more content items that have not been previously provided to the client device and a missed feed unit. The missed feed unit may be, e.g., a missed content item or a link that, when selected, redirects the user to a new page that presents a different content feed including the identified missed content items, or a link that, if selected, retrieves and presents one or more missed content items within the content feed. The content items are ordered in the subsequent content feed based on engagement scores. In some embodiments, the engagement scores may be adjusted by a position discount value that reflects a predicted decrease in user interaction with the content item based on a position in the interface in which the content item is presented.

The social networking system determines a location in the content feed for a missed feed unit. In some embodiments, the social networking system inserts the missed feed unit into a predicted location within the subsequent content feed (e.g., user historically views only content items in the first three positions of a news feed, and the social networking system inserts the missed feed unit within the first three positions). Alternatively, the social networking system may generate a missed feed score using missed item scores (e.g., based on engagement scores, etc.) associated with one or more of the missed content items. The social networking system generates a displacement score associated with each content item in the subsequent content feed. For example, the social networking system may generate a displacement score for a content item by adjusting the engagement score associated with the content item such that it reflects a later position (e.g., one slot displacement downward) in the subsequent content feed. The social networking system positions the missed feed unit above the content item whose displacement score is the closest, but lower than, the missed feed score. The social networking system then inserts the missed feed unit into the content feed at the determined location, and provides the subsequent content feed to the client device for presentation to the user.

Alternatively, the missed feed unit may be automatically presented by the client device in or associated with the content feed (e.g., as an icon or selectable feature within or overlaid on the content feed) if a trigger condition is met. For example, the trigger condition may be satisfied by, e.g., a number of new content items that have not previously been presented to the user exceeding a threshold value, all of the new content items in the content feed that have not been presented to the user, or the missed feed score being greater than the sum of the engagement scores of content items that are in the content feed but have not yet been presented by the client device. Responsive to a selection of the missed feed unit, the client device may retrieve the one or more missed content items from local storage and/or from the social networking system. The client device presents a portion of the one or more missed content items, skipping over intervening content items in the content feed that were originally between the content items being displayed when the missed feed unit was selected and the missed content items.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
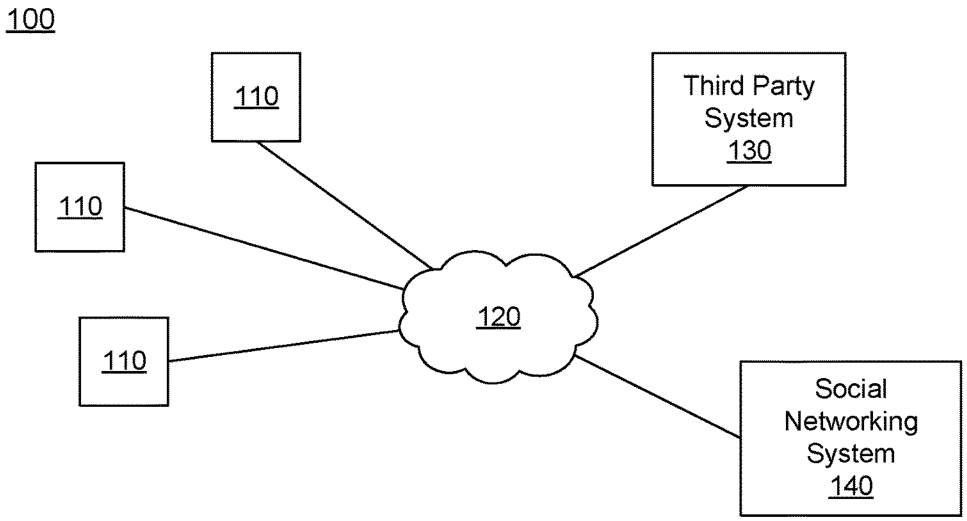
FIG. 1 is a block diagram of a system environment in which a social networking system operates, in accordance with an embodiment.

FIG. 1 is a high level block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In some embodiments, a client device 110 includes instructions, such as program code, that when executed by the client device 110 communicates information describing what content items of a content feed were displayed and/or not displayed to a user via the client device 110. For example, the program code is included in an application associated with the social networking system 140 executing on the client device 110 and communicates information describing whether stories in a content feed were presented to a user of the social networking system 110 via the client device 110. As described in detail below with respect to FIG. 2, a content item may be a story or an advertisement. Content items that were part of the content feed, but not viewed by the user are referred to as missed content items (e.g., an unread story).

A user is considered to have viewed a content item when the content item is presented by a client device 110. The instructions executed by the client device 110 determine if a content item was presented to a user based on interactions with the client device 110. For example, a determination that the user viewed the content item may be based on a percentage of the content item presented by the client device 110, a time duration that some threshold amount of the content item is presented by the client device 110, or any other suitable information.

A status of a content item may be new, read, unread, or missed. A new content item is a content item that has not been previously presented by the client device 110, where it is the first time the content item has been provided in a news feed for the user. A read content item is a content item that has been presented by the client device 110. An unread content item is a content item that was previously presented by the client device 110 and has an engagement score that has since increased above a threshold value. And, as described above, a missed content item is a content item that was part of a previous content feed, but was not viewed by the user (i.e., deemed to have not been presented by the client device 110).

In some embodiments, the client device 110 tracks statuses associated with content items in received content feeds via, e.g., an application associated with the social networking system 140. The client device 110 may store the tracked statuses in, for example, a status log. The status log is a database that tracks the most recent status of the content item in a content feed received from the social networking system 140. In embodiments, where a status associated with a content item is already in the status log, the client device 110 may remove or reposition a content item in a content feed if the status of the content item does not match the status of the content item in the status log. Additionally, in some embodiments, the content feed may include a time stamp associated with a status of a content item. The client device 110 may then compare the time stamp associated with the status of the received content item to the time stamp associated with the status of the content item in status log, and may adjust the status of the content item to be the status associated with the most recent time stamp. Thus, the client device 110 is able to ensure that the content items are presented to the user in the appropriate manner (e.g., a read content item is not presented as a new content item).

In some embodiments, the client device 110 may receive instructions from the social networking system 140 that cause the client device 110 to emphasize content items that have not been presented by the client device 110. The client device 110 may emphasize a content item by, e.g., adding a vertical bar to one side of the content item being displayed, highlighting a boarder of the content item, oversizing the content item, some other indicator that differentiates the content item from other content items that have previously been presented by the client device 110, or some combination thereof. Once the content items have been presented, the client device 110 stops emphasizing the content item. For example, the client device 110 may emphasize a new content item in a content feed (e.g., by including a vertical bar to the left of the new content item). Once the client device 110 determines that the new content item has been presented (e.g., content item was presented for a time period exceeding a threshold value) the client device 110 removes the emphasis of the new content item (e.g., vertical bar fades away) and the status associated with the new content item changes from new to read.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

Figure 2:
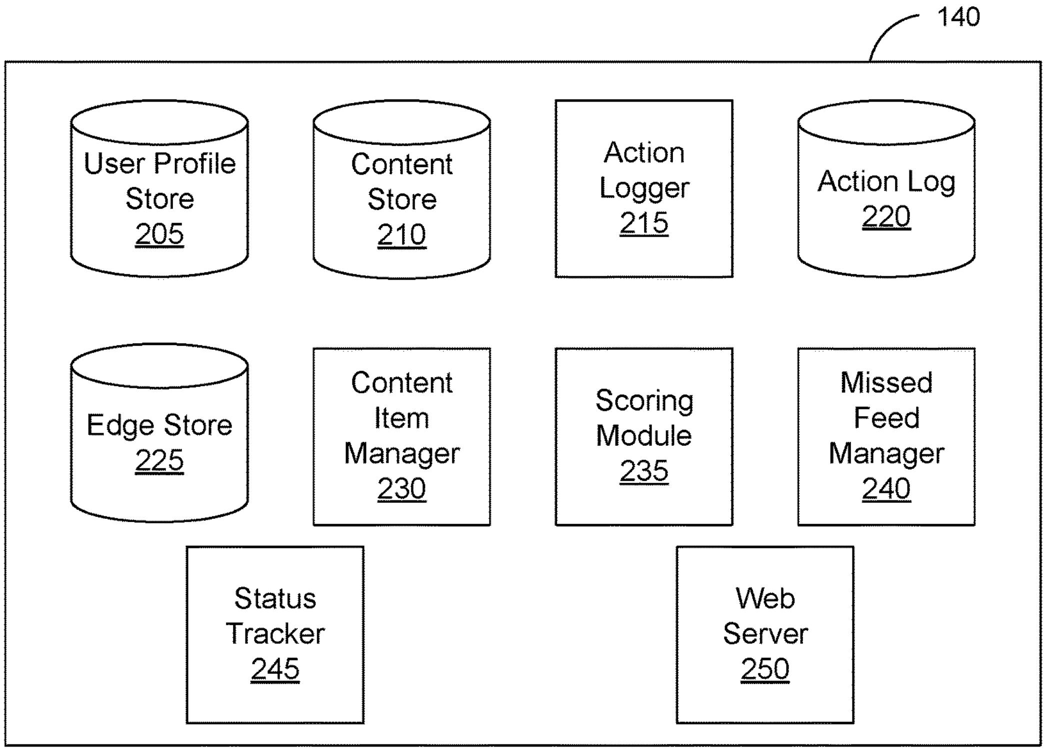
FIG. 2 is a block diagram of a social networking system, in accordance with an embodiment.

FIG. 2 is an example block diagram of an architecture of the social networking system 140. The social networking system 140 shown in FIG. 2 includes a user profile store 205, a content store 210, an action logger 215, an action log 220, an edge store 225, a content item manager 230, a scoring module 235, a missed feed manager 240, a status tracker 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the social networking system 140. In one embodiment, objects in the content store 210 represent single pieces of content, or content "items." Hence, users of the social networking system 140 are encouraged to communicate with each other by posting text and content items of various types of media through various communication channels. This increases the amount of interaction of users with each other and increases the frequency with which users interact within the social networking system 140. Additionally, the content store 210 may store missed content items.

One or more advertisement requests ("ad requests") are included in the content store. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites, such as this sporting equipment retailer, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content item manager 230 identifies content items likely to be of interest to a user through a "content feed" (e.g., a newsfeed) presented to the user. A content item may be a story or an advertisement. A story presented to a user describes an action taken by an additional user connected to the user and identifies the additional user. In some embodiments, a story describing an action performed by a user may be accessible to users not connected to the user that performed the action. The content item manager 230 may generate stories for presentation to a user based on information in the action log 220 and in edge store 225 or may select candidate stories included in content store 210.

For example, the content item manager 230 receives a request to present one or more content items to a social networking system user. The content item manager 230 accesses one or more of the user profile store 105, the content store 110, the action log 120, and the edge store 130 to retrieve information about the identified user. For example, stories or other data associated with users connected to the identified user are retrieved. The retrieved stories, advertisements, other data, or some combination thereof is analyzed by the content item manager 230 to identify content likely to be relevant to the identified user. For example, stories associated with users not connected to the identified user or stories associated with users for which the identified user has less than a threshold affinity are discarded as candidate content items. Based on various criteria, the content item manager 230 selects one or more of the candidate content items for presentation to the identified user in a content feed. Selection of content items for a content feed is further discussed in U.S. Pat. No. 7,827,208, filed on Aug. 11, 2006, U.S. Pat. No. 8,402,094, filed on Aug. 11, 2006, U.S. Pat. No. 8,171,128, filed on Aug. 11, 2006, U.S. Pat. No. 7,669,123, filed on Aug. 11, 2006, U.S. Pat. No. 8,700,636, filed on Sep. 16, 2010, U.S. Pat. No. 8,521,787, filed on Oct. 11, 2010, and U.S. Application Ser. No. 13/194,773, filed on Jul. 29, 2011, each of which is hereby incorporated by reference in its entirety.

The content item manager 230 may also account for actions by a user indicating a preference for types of stories and selects stories having the same, or similar, types for inclusion in the content feed. Additionally, content item manager 230 may analyze stories received by social networking system 120 from various users and obtains information about user preferences or actions from the analyzed stories. This information may be used to refine subsequent selection of stories for content feeds presented to various users.

The content feed may include a limited number of content items or may include a complete set of candidate content items. The number of content items for inclusion in a content feed may be determined in part by a user preference included in user profile store 205. The content item manager 230 provides the selected content items to the scoring module 235.

The scoring module 235 generates engagement scores for each of the selected content items. An engagement score measures a predicted level of interaction the user would have with a content item. In some embodiments, the engagement score is the sum of, for each action a user can take on a content item, the product of the probability of the user taking the action and a value of the user taking the action. The value of the user taking the action may be determined from, e.g., likes associated with the content item, comments associated with the content item, forwards or shares of the content item, postings of the content item, interactions of users connected to the user with the content item, or some combination thereof. For example, in some embodiments, the engagement score ES for a content item may be calculated by $$ES|_i = \overline{EV} \cdot \overline{VV} \quad (1)$$

Where $\overline{EV}$ is an engagement vector for each action, e.g., $\overline{EV}=[eCTR_{Like}, eCTR_{share}, eCTR_n]$, "eCTR" is the estimated click through rate, "n" is an index referring to the eCTR of a particular action, and $\overline{VV}$ is a value vector indicating values for the user taking particular actions, e.g., $\overline{VV}=[2_{Like}, 5_{share}, \ldots X_n]$, and "i" is an index referring to a particular content item. The values in the value vector for different actions may be adjusted by the social networking system 140, may differ from user to user, change for a particular user over time, etc.

The engagement scores may be based on information retrieved from the user profile store 205, the content store 210, the action log 220, and/or the edge store 225. For example, an engagement score may be based on affinities between the user and an object or between the user and another user associated with various content items. Additionally, prior actions associated with the user and associated with content items previously presented to the user may be used to determine the expected amount of user interaction with the content items to be presented. In one embodiment, user interactions with content items presented within a specified time interval are retrieved from the action log 220 and used to determine the engagement score for one or more content items.

In some embodiments, where the content item is an advertisement, when generating an engagement score associated with the advertisement, the scoring module 235 accounts for a bid amount associated with the advertisement as well as an expected amount of user interaction with the advertisements. In one embodiment, the scoring module 235 applies a conversion factor to the expected amount of user interaction and the bid amount to convert the expected amount of user interaction and the bid amount to a common unit of measurement. The score associated with the advertisement is generated by combining the expected amount of user interaction and the bid amount after application of the conversion factor. For example, the conversion factor is applied to the bid amount associated with an advertisement, and the bid amount after application of the conversion factor is combined with the expected amount of user interaction with the advertisement to generate the score associated with the advertisement. Combining a bid amount with an expected amount of user interaction is further described in U.S. patent application Ser. No. 13/545,266, filed on Jul. 10, 2012, which is hereby incorporated by reference in its entirety.

Additionally, in some embodiments, the scoring module 235 determines that a user has a highest affinity for a specific user and increases the number of stories in the content feed associated with the specific user or modifies the positions in the content feed where stories associated with the specific user are presented. Additional actions performed by users with higher affinities may receive higher engagement scores. Determining affinity between objects in a social networking system 108 is further described in U.S. application Ser. No. 12/978,265, filed on Dec. 23, 2010, which is incorporated by reference herein in its entirety.

The scoring module 235 determines an order in which the selected content items are to be presented in a content feed. The scoring module 235 determines the order of the content items using the engagements scores, position discount values (as described below), or some combination thereof. For example, the scoring module 235 may rank the selected content items by their engagement scores. The scoring module 235 may then order the content items in the content feed according to their ranking. For example, the content item with the highest ranking would be presented first in the content feed and the content item with the lowest ranking would be presented last in the content feed.

In some embodiments, the scoring module 235 applies a position discount value to a score associated with a content item based on a position in the interface in which content associated with the application is presented. A position discount value reflects a predicted decrease in user interaction with the content item based on a position in the interface in which the content item is presented. For example, the scoring module 235 may apply position discount values to the engagement scores for each of the content items. In one example, the position discount value is based on a location within the interface in which the content item is presented relative to positions in the interface in which other content items are presented. Alternatively, the position discount value is based on a position in which a content item is presented relative to a reference position in the interface. The position discount value associated with a position may be based at least in part on a distance between the position and a reference position in the interface. In a content feed, there are a number of positions in which each content item can be placed. The first content item in the feed is the most likely to be interacted with by a viewing user, and each position thereafter is discounted by a certain amount that reflects a discount in likelihood of interaction with a content item due to its being in a less favorable position. Users often view only the first few stories in the feed and the farther down a story is, the less likely it is to be viewed. In some embodiments, the position discount value associated with each position in the feed is a known value determined in advance by the social networking system and is applicable across various feeds. Determining a position discount value associated with a position is further described in U.S. patent application Ser. No. 14/049,429, filed on Oct. 9, 2013, which is hereby incorporated by reference in its entirety. The scoring module 235 provides the ordered content items as a content feed to the missed feed manager 240.

The missed feed manager 240 communicates with the client devices 110 to identify missed content items in content feeds previously provided to the client devices 110. The missed feed manager 240 generates a missed feed score using one or more missed item scores associated with the missed content items. The missed feed score may be, e.g., the sum of each of the missed item scores for each of the missed content items, the highest score of the missed item scores, a weighted score generated using one or more of the missed item scores, or some combination thereof. Additionally, in some embodiments, in generating the missed feed score, the missed feed manager 240 uses one or more parameters. Parameters may be, e.g., only using missed content items that are no older than some threshold value (e.g., 5 days) to generate the missed feed score, user navigation history, time since the missed content item was provided, but not displayed, to the client device 110, or some combination thereof. A missed item score may be an engagement score for a missed content item, or some other metric. Additionally, in some embodiments, the missed item score for a content item may be adjusted by a position discount value of the missed content item within a missed content feed.

The missed feed manager 240 generates a missed feed unit. A missed feed unit is an object placed in a content feed that is associated with one or more missed content items. The missed feed unit may be, e.g., a link to a missed content feed that includes one or more missed content items, one more missed content items, a link to one or more missed content items within the content feed, or some combination thereof. The missed feed manager 240 generates the missed content feed such that, if a link to the missed content feed is selected via a user of a client device 110, the missed feed manager 240 may provide the missed content feed to the requesting client device 110. The missed content items are ordered in the missed content feed according to their respective missed item scores. The missed content feed is a type of content feed that only includes missed content items. In some embodiments, the missed content feed includes only stories. Additionally, in some embodiments, the missed content feed only includes content items that are no older than a threshold duration of time (e.g., 3 days old).

In some embodiments, the missed feed manager 240 uses information previously received from the client device 110 describing which missed feed stories were presented to the user to determine the threshold duration of time. For example, if the information indicates that the user has viewed all missed stories through a particular date time, the missed feed manager 240 sets the threshold duration of time such that no missed content items older than the particular date are included in the missed content feed and/or the content feed.

The missed items scores associated with the missed content items may change over time. For example, in the time that elapsed from when a missed content item was last delivered to a client device 110 and not presented, and the time the missed content feed is generated, the engagement score associated with the missed content item may have changed. For example, connections to the user in the social networking system 140 may have liked, reposted, etc., the missed content item, thereby increasing its associated engagement score. Thus, the missed item scores for missed content items may change over time, thus, potentially causing the ranking of the missed content items in the missed content feed and/or the content feed to change as well.

In some embodiments, responsive to a request from the client device 110 (e.g., caused by the selection of the missed feed unit by a user of the client device 110), the missed feed manager 240 retrieves the one or more missed content items, and provides them to the client device 110 as part of the content feed. The missed feed manager 240 places them in the content feed such that, once the missed feed unit is selected and the one or more missed content items are provided to the client device 110, the client device 110 presents the first of the one or more missed content items to the user, as is further discussed in regard to FIGS. 5 and 6A-6B below. For example, the missed feed unit may be a selectable link titled "Missed Stories" that overlays a portion of the content feed and, if selected, scrolls the content feed to a first missed content item of one or more missed content items. In some embodiments, the content items in the content feed that are skipped due to selection of the missed feed unit are placed above the first of the missed feed content items, such that a user may scroll up to see the skipped content items. Additionally, in some embodiments, the missed feed manager 240 may place new content items, read content items, unread content items, or some combination thereof after the last of the missed content items. Additionally, in some embodiments, the content items placed after the missed content items may be associated with a particular time duration (e.g., less than a day old, etc.). The order of the missed content items in the content feed may be determined in the same manner as the order of the missed content items in the missed content feed described above.

Additionally, in some embodiments the missed feed unit may be dismissed by the user. In some embodiments, once the missed feed unit is dismissed, it may not be presented again to the user unless, e.g., the content feed is scrolled back up to the top of the content feed (e.g., first content item presented to the user), In some embodiments, the missed feed manager 240 calculates a displacement score for one or more content items in the content feed. A displacement score is a measure of the cost of displacing a content item to a later position in the content feed. In some embodiments, the displacement score is calculated for a content item by multiplying the engagement score of the content item by a displacement factor. A displacement factor is a cost of displacing a content item in the content feed. For example, when a missed feed unit is placed as a fourth content item in a display of content items, it is displacing all of the content items below it. In some embodiments, the displacement factor is simply the position discount value of the next slot in the content feed (e.g., if a content item is in slot 2, the displacement factor may simply be the position discount value for slot 3). The content item that otherwise would have been the fourth content item is now moved down to the fifth content item, and all of the content items below are similarly displaced. Thus, the social networking system 140 places the missed feed unit at a location at which its missed feed score is greater than this cost of displacing the content items in the lower positions. In some embodiments, the missed feed manager 240 calculates a displacement score for all of the ordered content items to be included in the content feed. Alternatively the missed feed manger 240 calculates a displacements score for only a portion of the ordered content items to be included in the content feed.

The missed feed manager 240 determines a location in a content feed to insert a missed feed unit. In some embodiments, the missed feed unit is inserted into the content feed at the first location where the missed feed score is greater than the displacement score. Thus, the missed feed unit would be placed in a position immediately above the content item whose displacement score is the closest, but lower than the missed feed score, and below a content item whose associated displacement score is greater than the missed feed score. In alternate embodiments, the missed feed manager 240 inserts the missed feed unit at some predicted location within the content feed. In some embodiments, the predicted location may be determined based on historical viewing data of a user. For example, the missed feed manager 240 may determine from previously viewed content feeds that a user generally only views the first 5 content items in the content feed. The missed feed manager 240 may then place the missed feed unit such that it is displayed in the content feed before the $6^{th}$ content item is presented. In alternate embodiments, the missed feed manager 240 may automatically set, e.g., the predicted location to be a particular position in the content feed. For example, the missed feed manager 240 may automatically set the predicted location to be the third item in the content feed presented to the user.

In some embodiments, the missed feed manager 240 may cause the missed feed unit to be presented by the client device 110 if a trigger condition is met. A trigger condition is one or more conditions that, if satisfied, cause the client device 110 to present the missed feed unit. A trigger condition may be met, for example, if a number of content items in the content feed exceed a threshold value and the content items are located in the content feed ahead of the one or more missed content items. For example, if the threshold value is three, the missed feed manager 240 may cause the client device 110 to present the missed feed unit if the number of content items before the one or more missed content items is greater than three. This provides the user of the client device 110 an option to jump directly to the missed content items without getting bogged down by new and/or unread content items in the content feed. In some embodiments the trigger condition may be met if all of the new and/or unread content items in the content feed have been presented to the user. In some embodiments, the missed feed manager 240 may also determine whether the trigger condition is met unit using the missed feed score and the engagement scores of the content items. For example, a trigger condition may be met if the missed feed score is greater than the sum of the engagement scores of new and/or unread content items that are in the content feed but have not yet been presented by the client device 110 during a particular session. The missed feed manager 240 provides the content feed to the web server 250.

In some embodiments, the missed feed manager 240 may generate instructions for the client devices 110 that cause client devices 110 to emphasize content items that have not been presented. The instructions cause the client devices 110 to emphasize content items that have not been presented by the client devices 110 by, e.g., adding a vertical bar to one side of the content item being displayed, highlighting the boarder of the content item, oversizing the content item, some other indicator that differentiates the content item from other content items that have previously been presented by the client device, or some combination thereof. Once the content items have been presented, the instructions cause the client devices 110 to stop emphasizing the content items.

The status tracker 245 tracks statuses associated with content items. As discussed above, a status of a content item may be new, read, unread, or missed. In some embodiments, an engagement score of a read content item may increase above a threshold value, causing the status tracker 245 to change the status associated with the content item from read to unread. For example, connections to the user in the social networking system 140 may have liked, reposted, etc., a read content item, thereby increasing its associated engagement score. Thus, the engagement score for the read content item may change over time, and if the engagement score increases over a threshold value the status tracker may change the status of the content item to unread. And, as described above, a missed content item is a content item that was part of a previous content feed, but not viewed by the user (i.e., deemed to have been presented by the client device 110). The status tracker 245 associates statuses with content items, and updates the statuses based on information received from the client device 110.

In some embodiments, the status tracker 245 uses information received from the client device 110 describing what content items of a content feed were displayed and/or not displayed to a user via the client device 110. The status tracker 245 updates the status associated with the content items using this information. For example, the information may indicate that a new content item was presented to the user, the status tracker 245 then updates the status of the new content item from new to read. Additionally, in some embodiments, the status tracker 245 includes a time stamp associated with the status of content items in the content feed.

The web server 250 links the social networking system 140 via the network 120 to the one or more client devices 110, as well as to the one or more third party systems 130. The web server 250 serves web pages, as well as other web-related content, such as JAVA®, FLASH®, XML and so forth. The web server 250 may provide content feeds to the client device 110. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or RIM®.

Generating a Content Feed Including a Missed Feed Unit

Figure 3:
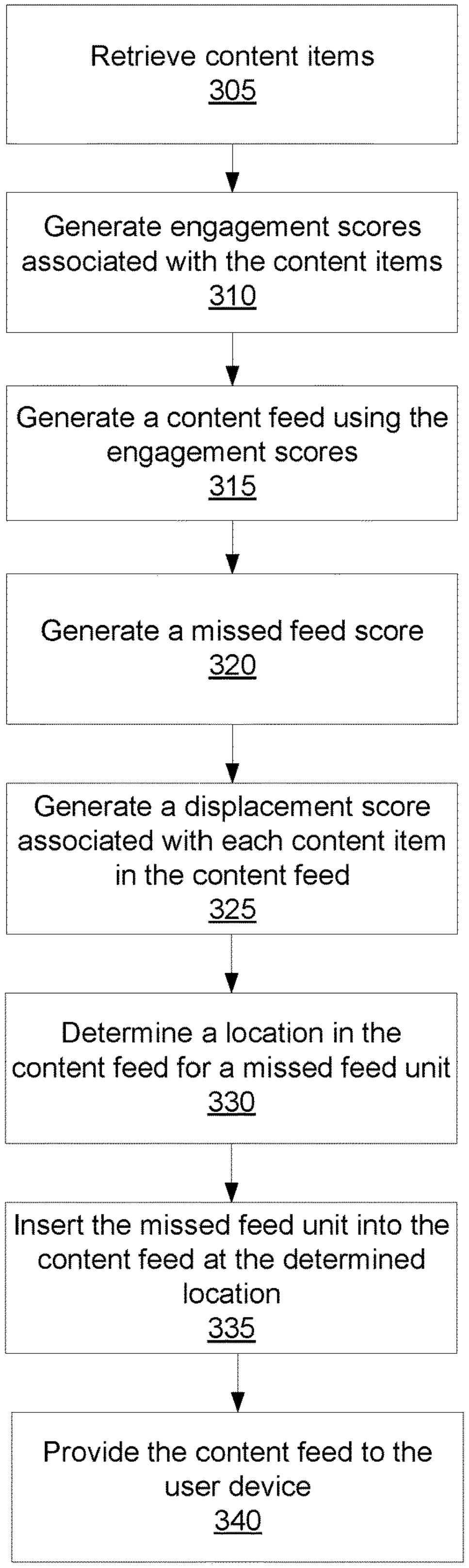
FIG. 3 is a flowchart illustrating a process for generating a content feed including a missed feed unit according to an embodiment.

FIG. 3 is a flowchart illustrating a process for generating a content feed including a missed feed unit according to an embodiment. In one embodiment, the process of FIG. 3 is performed by the social networking system 140. However, in other embodiments, other entities may perform some or all of the steps of the process. Likewise, embodiments may include different and/or additional steps, or perform the steps in different orders.

The social networking system 140 retrieves 305 content items for presentation to the user in a content feed. The social networking system 140 identifies and retrieves content items that are likely be relevant to the identified user. For example, the social networking system 140 may consider connections to the user, user preferences for stories, targeting information for advertisements, etc.

The social networking system 140 generates 310 engagement scores associated with the content items. For example, the social networking system 140 may determine value vectors and engagement vectors for each content item, and then determine the engagement scores for the retrieved content items using equation (1) described above. Additionally, in some embodiments, one or more of the engagement scores may be modified by position discount values.

The social networking system 140 generates 315 a content feed using the engagement scores. For example, the social networking system 140 ranks the content items according to their respective engagement score and positions the content items in the content feed according to the ranking.

The social networking system 140 generates 320 a missed feed score. The social networking system 140 identifies missed content items (e.g., using information from a client device 110 associated with the user). The social networking system 140 calculates missed item scores for each missed content item. The social networking system 140 then generates the missed feed score using one or more of the missed item scores. For example, the missed feed score may be the sum of some or all of the missed feed scores, the highest missed feed score, etc.

The social networking system 140 generates 325 a displacement score associated with each content item in the content feed. The social networking system 140 generates displacement factors for each of the content items. The social networking system 140 multiplies, for each of the content items, the engagement score and the displacement factor associated with that content item to generate a corresponding displacement score. For example, the social networking system 140 may generate a displacement score for a content item by adjusting the engagement score associated with the content item such that it reflects a later position (e.g., one slot displacement downward) in the content feed. In alternate embodiments, the social networking system 140 determines a displacement score for some of the content items, for example, content items below a particular position in the content feed.

The social networking system 140 determines 330 a location in the content feed for a missed feed unit. In some embodiments, the social networking system 140 identifies the first location where the missed feed score is greater than the displacement score. Thus, the missed feed unit would be positioned above the content item whose displacement score is the closest, but lower than, the missed feed score. In alternate embodiments, the determined location is some fixed location within the content feed. The social networking system 140 then inserts 335 the missed feed unit into the content feed at the determined location, and provides 340 the content feed to the client device 110 for presentation to the user.

Figure 4:
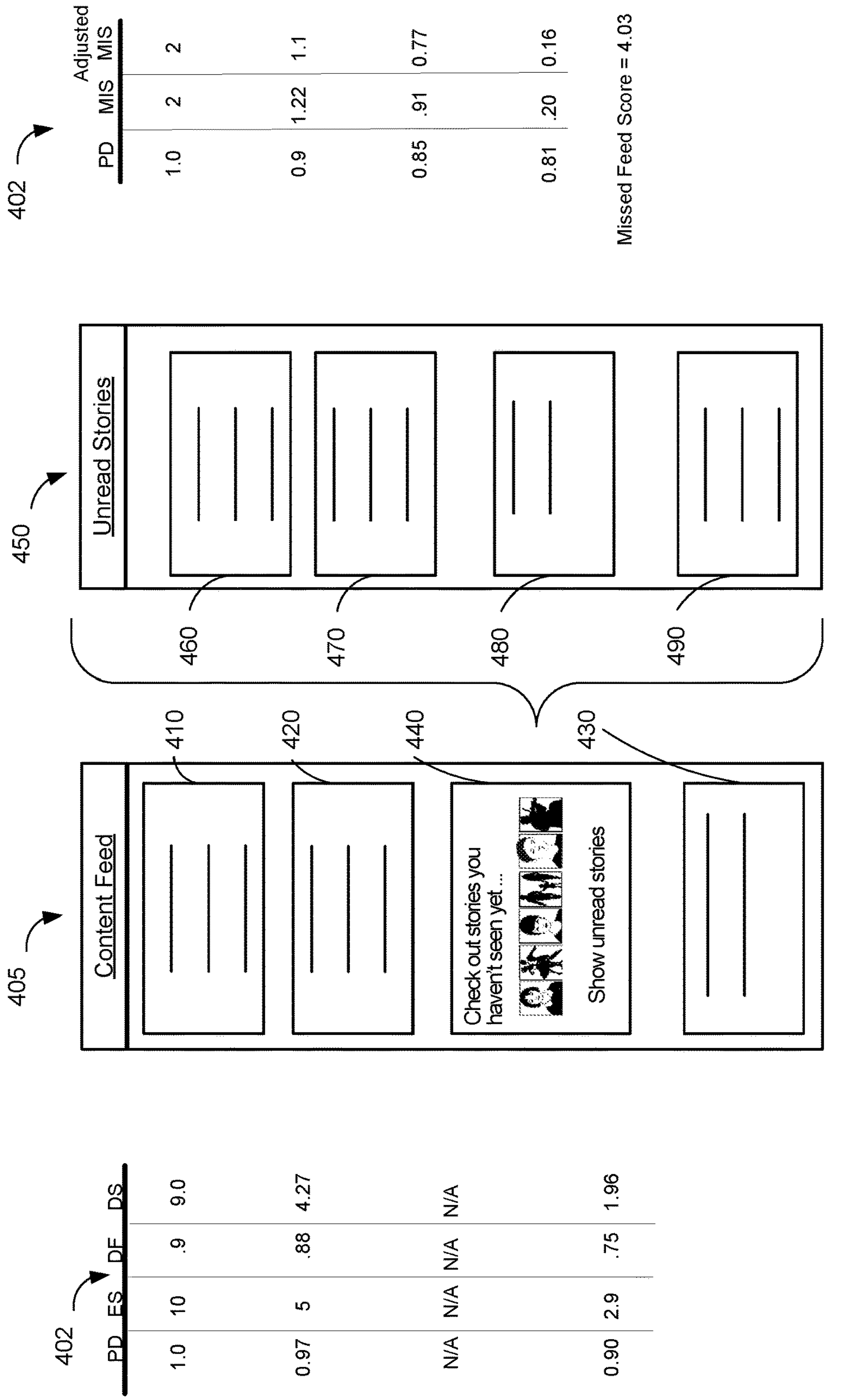
FIG. 4 illustrates a content feed including a missed feed unit and an associated missed content feed according to an embodiment.

FIG. 4 illustrates a content feed including a missed feed unit and an associated missed content feed according to an embodiment. The content feed 405 includes three content items 410, 420, and 430, and a missed feed unit 440. Table 402 illustrates various scores associated with content in the content feed 405. Table 402 includes position discount (PD) values, engagement scores (ES), displacement factors (DF), and displacement scores (DS). In this embodiment, the discount score is determined by:

$$DS(i)=PD(i)\times ES(i)\times DF(i) \qquad (2)$$

Wherein "i" is an index value referring to a particular content item. The content item 410 has the highest displacement score, 9.0, followed by the content item 420 with a displacement score of 4.27, and so on, with the content item 430 having the lowest displacement score of 1.96.

In this embodiment, the missed feed unit 440 has a missed feed score of 4.03, and the missed feed score, 4.03, is the sum of the missed item scores (MIS) of missed content items 460, 470, 480, and 490, seen in table 404. In this example, the missed feed score is higher than the displacement score of the content item 430, 1.96, but less than the displacement score of content item 420, 4.27. Thus, the missed feed unit 440 is located in the content feed 405 below content item 420 and above content item 430.

In this embodiment, the missed feed unit 440 is a link, that when selected, redirects the user to a missed content feed 450 that can be a page separate from the original content feed page. The missed content feed 450 includes missed content items 460, 470, 480, and 490 that were previously provided to the client device 110, but not presented to the user. In this embodiment, the missed content feed is titled "unread stories" and the missed content items 460, 470, 480, and 490 are all stories. In alternate embodiments, one or more of the missed content items 460, 470, 480, and 490 may be advertisements. The missed content item 460 has the highest missed item score, followed by missed content item 470, and so on, with the missed content item 490 having the lowed missed item score. The missed feed unit 440 can include profile photos, names and/or other identifiers of users connected to the user viewing the feed, where those users shown in the missed feed unit are the users about whom the missed content feed 450 includes stories. The profile photos can be ordered, for example, by affinity of the viewing user for the users in the photos. In this manner, the viewing users can quickly review the photos to determine whether he is interested in viewing missed content items from those users.

Figure 5:
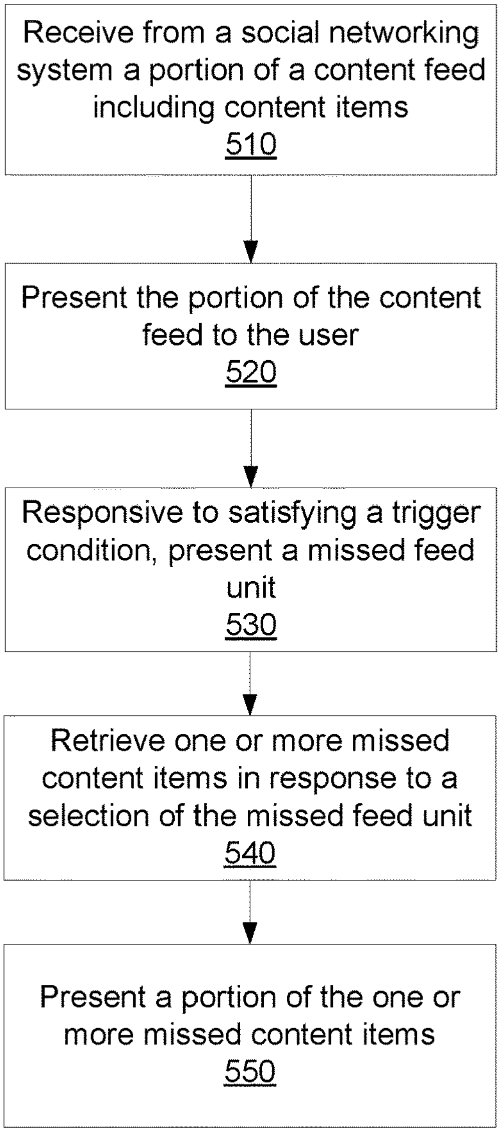
FIG. 5 is a flowchart illustrating a process for presenting a content feed including a missed feed unit according to an embodiment.

FIG. 5 is a flowchart illustrating a process for presenting a content feed including a missed feed unit according to an embodiment. In one embodiment, the process of FIG. 5 is performed by the client device 110 associated with a user. However, in other embodiments, other entities may perform some or all of the steps of the process. Likewise, embodiments may include different and/or additional steps, or perform the steps in different orders.

The client device 110 receives 510 from the social networking system 140 a portion of a content feed including content items. The content items may be new content items, read content items, unread content items, missed content items, or some combination thereof.

The client device 110 presents 520 the portion of the content feed to the user. In some embodiments, the client device 110 emphasizes new content items by, e.g., displaying a vertical bar to the left of the content item. Once the client device 110 determines that the new content item has been presented, the client device 110 updates the status of the content item from new to read, and stops emphasizing the content item (e.g., bar fades away).

Responsive to satisfying a trigger condition, the client device 110 presents 530 a missed feed unit. For example, the trigger condition may be satisfied by, e.g., a number of content items in the content feed exceed a threshold value and the content items being located in the content feed ahead of the one or more missed content items, all of the new content items in the content feed having been presented to the user, or the missed feed score being greater than the sum of the engagement scores of content items that are in the content feed but have not yet been presented by the client device 110. The missed feed unit may be, e.g., a selectable icon that overlays a portion of the content feed (see, e.g., FIG. 6A).

Responsive to a selection of missed feed unit, the client device 110 retrieves 540 one or more missed content items. The client device 110 may retrieve the one or more missed content items from the portion of the content feed and/or may retrieve the one or more missed content items from the social networking system 140. The client device 110 presents 550 a portion of the one or more missed content items.

Figure 6B:
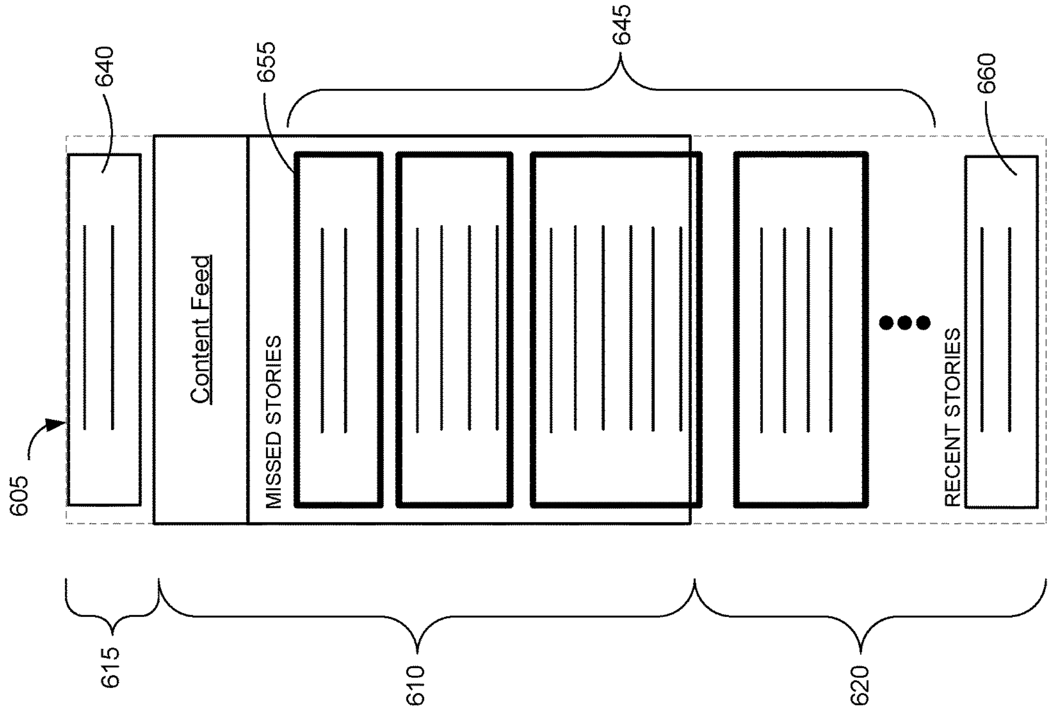
FIG. 6B illustrates the content feed of FIG. 6A after selection of the missed feed unit according to an embodiment.
Figure 6A:
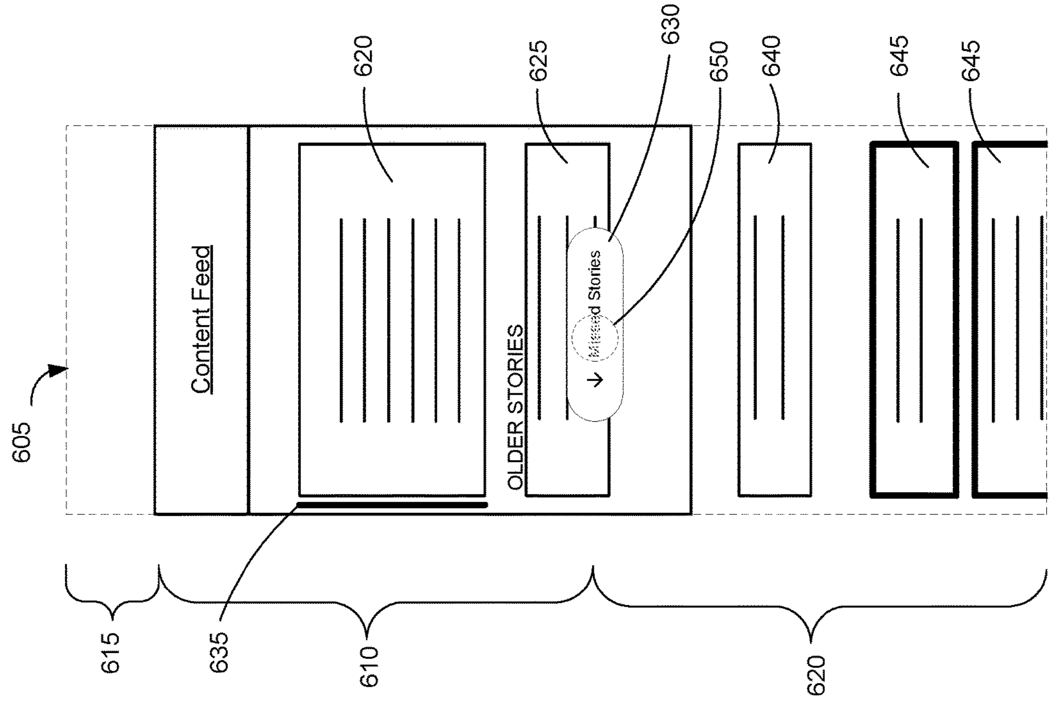
FIG. 6A illustrates a content feed including a missed feed unit according to an embodiment.

FIG. 6A illustrates a content feed 605 including a missed feed unit 630 according to an embodiment. The content feed 605 includes an active portion 610 of the content feed 605 that is being displayed by the client device 110, and a top virtual portion 615 and a bottom virtual portion 620 of the content feed 605 that may include content items that are not being displayed by the client device 110. Content items in the top virtual portion 615 and/or the bottom virtual portion 620 are content items stored on the client device 110 and/or content items that may be retrieved from the social networking system 140. In FIG. 6A, the active portion 610 is presenting a new content item 620, a read content item 625, and the missed feed unit 630. The client device 110 is emphasizing the new content item 620 using a vertical bar 635. The missed feed unit 630 overlays a portion of the active portion 610 of the content feed 605.

As a user scrolls up through the content feed 605, content items in the active portion 610 may be moved into the top virtual portion 615, and content items in the bottom virtual portion 620 may be moved into the active portion 610. In this example, the bottom virtual portion 620 includes a read and/or unread content item 640 and missed content items 645. A user selecting 650 the missed feed unit 630 causes the client device 110 to retrieve and present the missed content items 640.

FIG. 6B illustrates the content feed 605 of FIG. 6A after selection 650 of the missed feed unit 630 according to an embodiment. A portion of the missed content items 645 are presented in the active portion 610 of the content feed 605. The remaining missed content items 645 are placed in the bottom virtual portion 610 of the content feed 605 so that the user may scroll up to view other missed content items 645. The read and/or unread content item 640 is placed in the top virtual portion 615 of the content feed 605 such that the user may scroll up to get view the content items that were skipped over by the selection 650 of the missed feed unit 630. Additionally, the bottom portion 610 of the content feed 605 may include additional read and/or unread content item 660, which the user may scroll to after scrolling past the missed content items 645.

The client device 110 is emphasizing the missed content items 645 using a highlighted border 655. Once the client device 110 determines that a missed content item has been presented to the user, the client device 110 stops emphasizing the missed content item 645 (e.g., the highlight fades away).

Alternate Embodiments

Portions of the above description describes including a missed feed unit into a content feed provided to the user. In alternate embodiments, instead of including a missed feed unit, the social networking system 140 may include a link to some other content feed (e.g., news, etc.). The location of the link within the content feed may be determined in a manner substantially similar to that described above for a content feed including a missed feed unit.

Summary

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A computer-implemented method comprising:

providing a content feed to a client device associated with a user of an online system, the content feed including a plurality of content items that are associated with users of the online system;

identifying one or more missed content items, of the plurality of content items, that were part of the content feed and were not displayed by the client device;

identifying one or more new content items, of the plurality of content items, that have not been previously presented to the client device;

generating a subsequent content feed that includes: (1) a first portion that includes the identified one or more new content items; (2) a second portion that includes the identified one or more missed content items; and (3) a missed feed unit, wherein the missed feed unit is a user interface element that, when selected, displays the second portion of the content feed that presents the identified one or more missed content items; and providing the subsequent content feed to the client device for presentation to the user.

2. The method of claim 1, further comprising:

generating engagement scores for identified one or more new content items, the engagement scores measuring predicted levels of interaction the user would have with the corresponding content items.

3. The method of claim 2, wherein generating the subsequent content feed that includes: (1) the first portion that includes the identified one or more new content items, (2) the second portion that includes the identified one or more missed content items; and (3) the user selectable missed feed unit, further comprises:

ordering the one or more new content items based on the engagement scores; and inserting the missed feed unit into the subsequent content feed.

4. The method of claim 3, further comprising:

predicting positions of content items the user views in the subsequent content feed, wherein the missed feed unit is inserted into one of the predicted positions.

5. The method of claim 3, further comprising:

generating a missed feed score based on at least one of the missed content items;

generating displacement scores for the one or more new content items based on their respective engagement scores, the displacement scores indicating costs associated with displacing the one or more new content items to lower positions in the subsequent content feed and are based at least in part on the engagement scores; and determining a location in the subsequent content feed for the missed feed unit based on the missed feed score and the displacement scores, wherein the missed feed unit is inserted into the subsequent content feed at the determined location.

6. The method of claim 5, wherein generating the missed feed score based on the at least one of the missed content items, further comprises:

determining a missed item score for each of the at least one missed content items; and summing the missed item scores, wherein the sum of the missed items scores is the missed feed score.

7. The method of claim 5, wherein generating the missed feed score based on the at least one of the missed content items, further comprises:

determining a missed item score for each of the at least one missed content items;

ranking the missed items scores; and selecting a highest missed item score to be the missed feed score.

8. The method of claim 5, wherein the missed feed score is generated based on one or more missed content items that were previously provided to the client device within a threshold period of time.

9. A system comprising:

at least one processor; and a memory storing instructions that, when executed by the at least one processor, cause the system to perform:

providing a content feed to a client device associated with a user of an online system, the content feed including a plurality of content items that are associated with users of the online system;

identifying one or more missed content items, of the plurality of content items, that were part of the content feed and were not displayed by the client device;

identifying one or more new content items, of the plurality of content items, that have not been previously presented to the client device;

generating a subsequent content feed that includes: (1) a first portion that includes the identified one or more new content items; (2) a second portion that includes the identified one or more missed content items; and (3) a missed feed unit, wherein the missed feed unit is a user interface element that, when selected, displays the second portion of the content feed that presents the identified one or more missed content items; and providing the subsequent content feed to the client device for presentation to the user.

10. The system of claim 9, wherein the instructions cause the system to further perform:

generating engagement scores for identified one or more new content items, the engagement scores measuring predicted levels of interaction the user would have with the corresponding content items.

11. The system of claim 10, wherein generating the subsequent content feed that includes: (1) the first portion that includes the identified one or more new content items, (2) the second portion that includes the identified one or more missed content items; and (3) the user selectable missed feed unit, further comprises:

ordering the one or more new content items based on the engagement scores; and inserting the missed feed unit into the subsequent content feed.

12. The system of claim 11, wherein the instructions cause the system to further perform:

predicting positions of content items the user views in the subsequent content feed, wherein the missed feed unit is inserted into one of the predicted positions.

13. The system of claim 11, wherein the instructions cause the system to further perform:

generating a missed feed score based on at least one of the missed content items;

generating displacement scores for the one or more new content items based on their respective engagement scores, the displacement scores indicating costs associated with displacing the one or more new content items to lower positions in the subsequent content feed and are based at least in part on the engagement scores; and determining a location in the subsequent content feed for the missed feed unit based on the missed feed score and the displacement scores, wherein the missed feed unit is inserted into the subsequent content feed at the determined location.

14. The system of claim 13, wherein generating the missed feed score based on the at least one of the missed content items, further comprises:

determining a missed item score for each of the at least one missed content items; and summing the missed item scores, wherein the sum of the missed items scores is the missed feed score.

15. The system of claim 13, wherein generating the missed feed score based on the at least one of the missed content items, further comprises:

determining a missed item score for each of the at least one missed content items;

ranking the missed items scores; and selecting a highest missed item score to be the missed feed score.

16. The system of claim 13, wherein the missed feed score is generated based on one or more missed content items that were previously provided to the client device within a threshold period of time.

17. A non-transitory computer-readable storage medium including instructions that, when executed by at least one processor of a computing system, cause the computing system to perform a method comprising:

providing a content feed to a client device associated with a user of an online system, the content feed including a plurality of content items that are associated with users of the online system;

identifying one or more missed content items, of the plurality of content items, that were part of the content feed and were not displayed by the client device;

identifying one or more new content items, of the plurality of content items, that have not been previously presented to the client device;

generating a subsequent content feed that includes: (1) a first portion that includes the identified one or more new content items; (2) a second portion that includes the identified one or more missed content items; and (3) a missed feed unit, wherein the missed feed unit is a user interface element that, when selected, displays the second portion of the content feed that presents the identified one or more missed content items; and providing the subsequent content feed to the client device for presentation to the user.

18. The non-transitory computer-readable storage medium of claim 17, wherein the instructions cause the computing system to further perform:

generating engagement scores for identified one or more new content items, the engagement scores measuring predicted levels of interaction the user would have with the corresponding content items.

19. The non-transitory computer-readable storage medium of claim 18, wherein generating the subsequent content feed that includes: (1) the first portion that includes the identified one or more new content items, (2) the second portion that includes the identified one or more missed content items; and (3) the user selectable missed feed unit, further comprises:

ordering the one or more new content items based on the engagement scores; and inserting the missed feed unit into the subsequent content feed.

20. The non-transitory computer-readable storage medium of claim 19, wherein the instructions cause the system to further perform:

predicting positions of content items the user views in the subsequent content feed, wherein the missed feed unit is inserted into one of the predicted positions.

* * * * *